(12) United States Patent
Imamura et al.

(10) Patent No.: US 7,886,568 B2
(45) Date of Patent: Feb. 15, 2011

(54) METHOD FOR ROLLING ELECTRODE HOOP

(75) Inventors: Kimihiro Imamura, Kanagawa (JP); Hiroyuki Usui, Kanagawa (JP); Keiji Minamino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 486 days.

(21) Appl. No.: 11/919,038

(22) PCT Filed: Apr. 11, 2006

(86) PCT No.: PCT/JP2006/307617

§ 371 (c)(1),
(2), (4) Date: Apr. 29, 2008

(87) PCT Pub. No.: WO2006/115035

PCT Pub. Date: Nov. 2, 2006

(65) Prior Publication Data

US 2009/0078018 A1    Mar. 26, 2009

(30) Foreign Application Priority Data

Apr. 25, 2005 (JP) ............................ 2005-126291

(51) Int. Cl.
*B21D 22/00* (2006.01)
(52) U.S. Cl. ................. 72/363; 72/47; 72/197; 72/365.2; 29/623.3
(58) Field of Classification Search ............ 72/46, 72/47, 191, 197, 199, 363, 365.2; 29/623.1, 29/623.3
See application file for complete search history.

(56) References Cited

U.S. PATENT DOCUMENTS

| | | | | |
|---|---|---|---|---|
| 974,288 A * | 11/1910 | McCarroll | .................... | 72/406 |
| 2,434,558 A * | 1/1948 | Gordon et al. | ................. | 72/39 |
| 2,582,744 A * | 1/1952 | Brennan | ....................... | 29/885 |
| 3,734,779 A * | 5/1973 | Shoeld | ......................... | 429/94 |
| 3,858,428 A * | 1/1975 | Thompson | .................... | 72/363 |
| 5,508,122 A * | 4/1996 | Narukawa et al. | ............. | 429/94 |
| 5,683,834 A | 11/1997 | Fujimoto et al. | | |
| 7,666,545 B2 * | 2/2010 | Oh et al. | ..................... | 429/129 |
| 2001/0014999 A1 | 8/2001 | Matsumura et al. | | |

FOREIGN PATENT DOCUMENTS

| | | | |
|---|---|---|---|
| JP | 61-226103 | * | 10/1986 |
| JP | 1-309703 | * | 12/1989 |

(Continued)

*Primary Examiner*—Edward Tolan
(74) *Attorney, Agent, or Firm*—McDermott Will & Emery LLP

(57) ABSTRACT

In a rolling step of feeding an electrode hoop (1) having electrode mixture layers (3a, 3b) formed on both sides of a band-shaped core (2) made of a metal thin plate to between a pair of mill rolls (8a, 8b) for rolling, the electrode hoop (1) is fed so that side a is wound about one of the mill rolls if the electrode mixture layers (3a, 3b) of the electrode hoop (1) have different average thicknesses, where the side a is one of the electrode mixture layers of the electrode hoop (1) having the smaller average thickness and side b is the other. This realizes a method for rolling an electrode hoop capable of making a rolled flat electrode even if the electrode mixture layers on both sides of the core have respective different thicknesses.

2 Claims, 1 Drawing Sheet

FOREIGN PATENT DOCUMENTS

| | | | |
|---|---|---|---|
| JP | 4-12471 | | 1/1992 |
| JP | 142731 | | 5/1994 |
| JP | 6-267535 | | 9/1994 |
| JP | 8-130035 | | 5/1996 |
| JP | 2000-79407 | * | 3/2000 |
| JP | 2001-297756 | | 10/2001 |
| JP | 2002-304988 | | 10/2002 |
| JP | 2003-132878 | | 5/2003 |
| JP | 2005-44690 | * | 2/2005 |
| JP | 2005-276444 | | 10/2005 |

* cited by examiner

METHOD FOR ROLLING ELECTRODE HOOP

RELATED APPLICATIONS

This application is the U.S. National Phase under 35 U.S.C. §371 of International Application No. PCT/JP2006/307617, filed on Apr. 11, 2006, which in turn claims the benefit of Japanese Application No. 2005-126291, filed on Apr. 25, 2005, the disclosures of which Applications are incorporated by reference herein.

TECHNICAL FIELD

The present invention relates to a method for rolling an electrode hoop that has electrode mixture layers formed on both sides of its core made of a metal thin plate, and in particular to a method for rolling an electrode hoop while suppressing warpage of the rolled electrode hoop when the electrode mixture layers on both sides have different thicknesses.

BACKGROUND ART

Batteries such as an alkali rechargeable battery and a lithium ion rechargeable battery are widely used as the power supply of a portable device, a power tool, or an electric vehicle. Typical methods for manufacturing electrodes thereof include one in which powder materials are filled into a three-dimensional porous metal body as with the positive electrode of an alkali rechargeable battery, and one in which an electrode mixture paste formed by kneading powder materials is applied to a core made of a metal thin plate as with the positive and negative electrodes of a lithium ion battery and the negative electrode of a nickel metal hydride battery. Among these electrode manufacturing methods, the latter application technique has particularly high productivity, and is thus applied regardless of the battery type. For high-efficiency manufacturing methods, there have also been proposed various types of manufacturing methods, including multi-row application (for example, see patent document 1 and patent document 2).

In the method of applying an electrode mixture paste to both sides of a core, the electrode mixture paste applied is dried to make an electrode hoop. Subsequently, as shown in FIG. 3, the electrode hoop 21 is mounted on an uncoiler unit 23 of a rolling system in the form of an electrode coil 22 wound in a coil shape. It is unwound by the uncoiler unit 23, and fed to a rolling unit 25 consisting of a pair of mill rolls 26a and 26b via a guide roll 24, whereby the electrode mixture layers 21b applied to both sides of the core 21a are rolled. It should be appreciated that the electrode mixture layers 21b on both sides are usually set to an identical thickness C. The electrode hoop 21 rolled by the rolling unit 25 is fed to a coiler unit 28 via a guide roll 27, thereby being wound up and taken out in a coil form.

Positive and negative electrodes fabricated thus are wound with a separator interposed therebetween to form an electrode assembly, which is inserted into a metal battery case before an electrolytic solution is poured in to make a desired battery.

[Patent Document 1] Japanese Patent Laid-Open Publication No. 2001-297756

[Patent Document 2] Japanese Patent Laid-Open Publication No. 2002-304988

DISCLOSURE OF THE INVENTION

Problems to be Solved by the Invention

By the way, for batteries of positive electrode limited capacity type (the positive electrode has a smaller theoretical capacity) such as a nickel metal hydride rechargeable battery and a lithium ion rechargeable battery, a negative electrode fabricated by the application method is often arranged on the outermost periphery of the electrode assembly so that it makes contact with the inner wall of the metal battery case for power collection. Since the negative electrode mixture layer lying outside the core of this negative electrode at the outermost periphery contributes little to battery reaction, it can be minimized in thickness to increase the battery capacity easily. One of the methods for thinning this negative electrode mixture layer outside the core of the negative electrode at the outermost periphery is to form negative electrode mixture layers of different thicknesses on respective sides of the negative electrode and wind the same with the thinner layer outside. It should be appreciated that even when using the mixture layers of different thicknesses on respective sides, the battery efficiency will not drop if the electrode mixture layers are made of an electrode mixture having a low resistance.

It is difficult, however, to produce batteries by using electrodes that have mixture application layers of different thicknesses on respective sides. More specifically, if the mixture application layers formed on both sides of the core have different thicknesses, rolling the electrode mixture applied and dried on both sides of the core causes an arcuate warpage of the electrode with the thicker application layer outward since the thicker application layer is easy to stretch because of easy material supply while the thinner is hard to stretch. When making an electrode assembly by winding electrodes with the thinner mixture application layer outside, the end of winding at the outermost periphery of the electrode assembly warps outward because the electrode assembly rolled with a distortion must be wound in an opposite direction. This has caused a drop in the insertability to the battery case, with the problem of increased short-circuit failures.

This also holds true for an electrode assembly of laminate type where positive and negative electrodes of strip shape are alternately laminated with separators interposed therebetween. The negative electrode arranged at the outermost side warps toward the outside of the electrode assembly with the same problem of a drop in the insertability to the battery case.

The present invention has been devised in light of the foregoing conventional problems, and it is thus an object thereof to provide a method for rolling an electrode hoop capable of obtaining a rolled flat electrode so as not to lower the insertability of the electrode assembly to a battery case when the electrode mixture layers on both sides have different thicknesses.

Means for Solving the Problems

To achieve the foregoing object, a method for rolling an electrode hoop according to the present invention includes: a feeding step of feeding an electrode hoop having electrode mixture layers formed on both sides of a band-shaped core made of a metal thin plate; a rolling step of feeding the electrode hoop to between a pair of mill rolls for rolling; and a winding step of winding up the rolled electrode hoop, wherein the electrode mixture layers on both sides of the electrode hoop have respective different average thicknesses, and in the rolling step, the electrode hoop is fed so that side a is wound about one of the mill rolls, where the side a is one of the electrode mixture layers of the electrode hoop having a smaller average thickness and side b is the other.

According to this configuration, the side a of the electrode mixture layers having the smaller average thickness makes contact with the mill roll over a wide area and undergoes a rolling effect for a long time while the other side b makes contact in a narrow area and undergoes the rolling effect for a short time. During rolling, the side a thus stretches naturally with an improvement to the flatness of the rolled electrode.

Moreover, the foregoing operation and effect can be obtained without fail by setting A/B between 0.1 inclusive and 1 exclusive, where A is the thickness of the thinner electrode mixture layer of the electrode hoop and B is the thickness of the other before rolling.

BEST MODE FOR CARRYING OUT THE INVENTION

Hereinafter, an embodiment of the method for rolling an electrode hoop according to the present invention will be described with reference to FIGS. 1 and 2.

Figure 1:
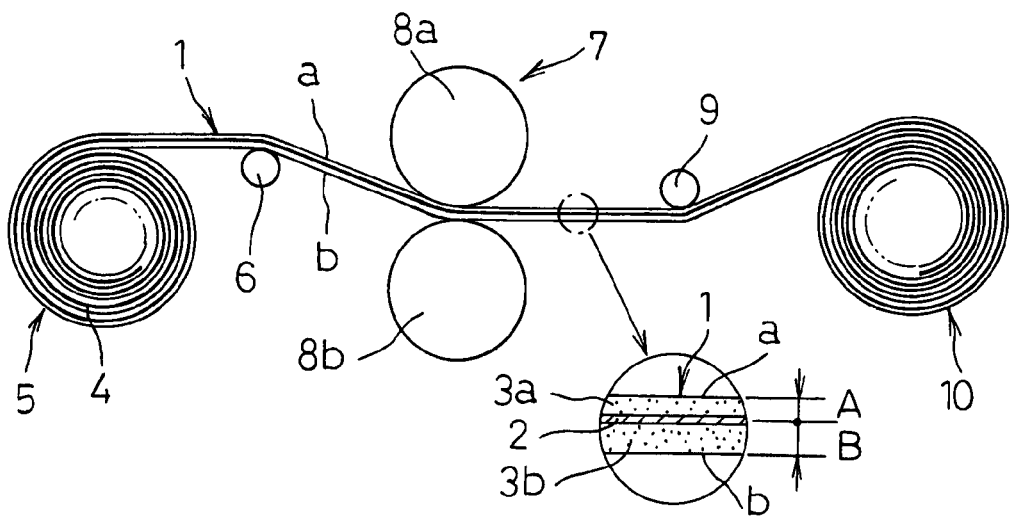
FIG. 1 is a side view schematically showing an embodiment of the method for rolling an electrode hoop according to the present invention.
Figure 2:
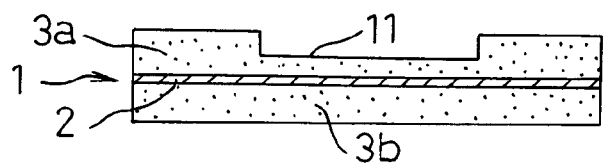
FIG. 2 is a cross-sectional view of another configuration example of the electrode hoop.

In FIG. 1, 1 denotes an electrode hoop which has electrode mixture layers 3a and 3b formed on both sides of a core 2 made of a metal thin plate. The electrode mixture layers 3a and 3b are formed by applying an electrode mixture paste onto both sides of the core 2 in an application unit, and are adjusted to predetermined application thicknesses in an application thickness adjustment unit, followed by drying. The electrode hoop 1 is mounted on an uncoiler unit 5 of a rolling system in the form of an electrode coil 4 wound in a coil shape. It is unwound by the uncoiler unit 5, and fed to a rolling unit 7 consisting of a pair of mill rolls 8a and 8b via a guide roll 6, whereby the electrode mixture layers 3a and 3b are rolled. The electrode hoop 1 rolled by the rolling unit 7 is fed to a coiler unit 10 via a guide roll 9, thereby being wound up and taken out in a coil form.

Here, one electrode mixture layer 3a of the electrode hoop 1 is formed to have a thickness A smaller than the thickness B of the other electrode mixture layer 3b. In this case, the guide roll 6 is arranged in a position shifted by a predetermined distance toward the surface a of the one electrode mixture layer 3a (upward in FIG. 1) from the contact point with the pair of mill rolls 8a and 8b, thereby feeding the electrode hoop 1 so that the surface a of the thinner electrode mixture layer 3a is wound about the mill roll 8a.

According to the foregoing configuration, the electrode mixture layer 3a can make contact with the mill roll 8a over an area wider than the area where the electrode mixture layer 3b makes contact with the mill roll 8b. This naturally stretches the electrode mixture layer 3a which is thinner and thus harder to stretch.

The foregoing operation and effect become significant when A/B falls within 0.1 inclusive and 1 exclusive, where A is the thickness of the electrode mixture layer 3a and B is the thickness of the electrode mixture layer 3b before rolling. In the meantime, it is confirmed by experiment that if A/B is smaller than 0.1, the flatness of the rolled electrode hoop is hard to secure even with the technology of the present invention.

The foregoing description of the embodiment has dealt with the electrode hoop 1 in which the electrode mixture layers 3a and 3b are applied to all over the core 2 with respective constant thicknesses. The thin electrode mixture layer 3a according to the present invention also covers the cases where it is small in average thickness. For example, as shown in FIG. 2, the same operation and effect are obtained when the electrode mixture layer 3a is given a small average thickness by forming a thin layer portion 11 in part of the area of the electrode mixture layer 3a in the width direction.

As can be seen from the foregoing description of the embodiment, the present invention is by no means limited to the negative electrode of a nickel metal hydride rechargeable battery as in the following practical examples as long as the electrode hoop has an electrode mixture applied to both sides of its core made of a metal thin plate. For example, it may be applied to a sintered substrate being a precursor of a sintered nickel positive electrode of an alkali rechargeable battery, and positive and negative electrodes of a lithium polymer battery using luster metal as the metal thin plate.

Hereinafter, a description will be given of examples where the present invention is applied to a negative electrode (hydrogen-absorption alloy electrode) of a nickel metal hydride rechargeable battery and a comparative example.

EXAMPLE 1

A hydrogen-absorption alloy represented by a composition formula $MmNi_{3.55}CO_{0.75}Mn_{0.4}Al_{0.3}$ was crushed into an average particle size of 30 μm in water by using a wet ball mill, thereby obtaining hydrogen-absorption alloy powder. This hydrogen-absorption alloy powder was immersed into an alkali aqueous solution for surface treatment before 100 kg of this hydrogen-absorption alloy powder was kneaded with 10 kg of carboxymethylcellulose aqueous solution having a solid content of 1.5% and 0.4 kg of Ketjenblack. Furthermore, 1.75 kg of styrene-butadiene copolymer rubber particles having a solid content of 40% were added thereto, and agitated in order to make an electrode mixture paste.

This electrode mixture paste was applied to across a width of 260 mm on both sides of a core 2 which was made of a nickel-plated iron punched metal having a thickness of 60 μm, a width of 300 mm, a punched hole diameter of 1 mm, and an opening ratio of 40%. By adjusting the position of the core when passed through the application thickness adjusting unit, the thicknesses of application on the respective sides were set so that the electrode mixture layer 3a on one side had a thickness A of 60 μm and the electrode mixture layer 3b on the other side a thickness B of 140 μm, i.e., A/B=0.43. The resultant was then dried to make the electrode hoop 1.

This electrode hoop 1 was rolled in such a physical relationship as shown in FIG. 1. Specifically, the distance from the guide roll 6 to the mill rolls 8a and 8b was 500 mm. The height of the guide roll 6 with respect to the mill rolls 8a and 8b was 50 mm.

A sample having a length of 200 mm in the rolling direction and a width of 50 mm was taken from the rolled electrode hoop 1. This sample was placed on a flat plate with the electrode mixture layer 3a up, measured between vernier calipers, and found to have a warp height of 0.3 mm.

EXAMPLE 2

The electrode mixture paste was applied and dried to fabricate the electrode hoop 1 as in the example 1 except that the electrode mixture layer 3a had a thickness A of 5 μm and the electrode mixture layer 3b had a thickness B of 195 μm so that A/B=0.03. This was rolled as in the example 1, and then measured for a warp height as in the example 1. The measurement was 1.3 mm.

EXAMPLE 3

The electrode mixture paste was applied and dried to fabricate the electrode hoop 1 as in the example 1 except that the electrode mixture layer 3a had a thickness A of 18 μm and the electrode mixture layer 3b had a thickness B of 182 μm so that A/B=0.1. This was rolled as in the example 1, and then measured for a warp height as in the example 1. The measurement was 0.7 mm.

EXAMPLE 4

The electrode mixture paste was applied and dried to fabricate the electrode hoop 1 as in the example 1 except that the electrode mixture layer 3a had a thickness A of 90 μm and the electrode mixture layer 3b had a thickness B of 110 μm so that A/B=0.82. This was rolled as in the example 1, and then measured for a warp height as in the example 1. The measurement was −0.2 mm.

COMPARATIVE EXAMPLE

Figure 3:
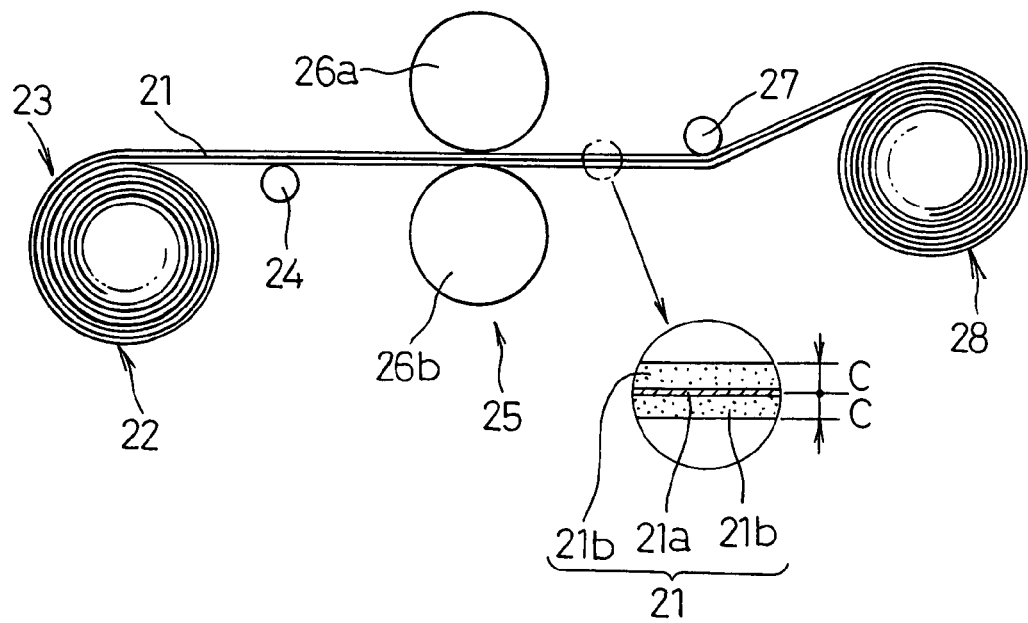
FIG. 3 is a side view schematically showing a method for rolling an electrode hoop according to a conventional example.

Using the same electrode hoop 1 as in the example 1, conventional rolling was performed as shown in FIG. 3. The warpage was measured as in the example 1, and found to be 2.7 mm.

As is evident from the foregoing description, feeding the thinner electrode mixture layer so as to be wound about a mill roller can stretch the thinner electrode mixture layer naturally during rolling and secure flatness after the rolling because the contact area with the mill roller can be made greater than that of the thicker electrode mixture layer. This consequently makes it possible to reduce the amount of warpage which is detrimental to the insertability of the electrode assembly to the battery case. It is also clarified that A/B preferably falls between 0.1 inclusive and 1 exclusive as in the examples 1, 3, and 4, where A is the thickness of the thinner electrode mixture layer and B is the thickness of the thicker electrode mixture layer.

INDUSTRIAL APPLICABILITY

As has been described, according to the method for rolling an electrode hoop of the present invention, it is possible to obtain an electrode capable of securing flatness after rolling even if the electrode mixture layers on both sides of the core have respective different thicknesses. Since the electrode assembly can be improved in insertability to the battery case, this method has high applicability as technology capable of manufacturing electrodes of various types of batteries with high productivity, and is useful for manufacturing electrodes of various batteries such as a lithium ion battery and a nickel metal hydride battery.

The invention claimed is:

1. A method for rolling an electrode hoop, comprising:
    a feeding step of feeding an electrode hoop having electrode mixture layers formed on both sides of a band-shaped core made of a metal thin plate;
    a rolling step of feeding the electrode hoop to between a pair of mill rolls for rolling; and
    a winding step of winding up the rolled electrode hoop,
    wherein the electrode mixture layers on both sides of the electrode hoop have respective different average thicknesses, and in the rolling step, the electrode hoop is fed so that side a is wound about one of the mill rolls on the condition that the side a makes contact with one of the mill rolls over a wide area and the other side b makes contact with the other of the mill rolls in a narrow area, where the side a is one of the electrode mixture layers of the electrode hoop having a smaller average thickness and side b is the other.

2. The method for rolling an electrode hoop according to claim 1, wherein A/B is set between 0.1 inclusive and 1 exclusive, where A is the thickness of the thinner electrode mixture layer of the electrode hoop and B is the thickness of the other before rolling.

* * * * *

UNITED STATES PATENT AND TRADEMARK OFFICE
CERTIFICATE OF CORRECTION

PATENT NO. : 7,886,568 B2  
APPLICATION NO. : 11/919038  
DATED : February 15, 2011  
INVENTOR(S) : Kimihiro Imamura Page 1 of 1

It is certified that error appears in the above-identified patent and that said Letters Patent is hereby corrected as shown below:

Title Page, Item (56) insert

--(56)                                References Cited

FOREIGN PATENT DOCUMENTS             JP 6-142731--

Signed and Sealed this  
Twenty-ninth Day of November, 2011

David J. Kappos  
*Director of the United States Patent and Trademark Office*